(12) United States Patent
Lickfelt et al.

(10) Patent No.: US 8,482,382 B2
(45) Date of Patent: Jul. 9, 2013

(54) SYSTEMS AND METHODS FOR CONTROLLING A SMART COMMUNICATION SYSTEM FOR A VEHICLE

(75) Inventors: Brian K. Lickfelt, Powell, OH (US); Dave G. Peterson, East Liberty, OH (US); Hideaki Arai, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 670 days.

(21) Appl. No.: 12/625,036

(22) Filed: Nov. 24, 2009

(65) Prior Publication Data

US 2010/0231351 A1 Sep. 16, 2010

Related U.S. Application Data

(60) Provisional application No. 61/159,593, filed on Mar. 12, 2009.

(51) Int. Cl.
*H04Q 9/00* (2006.01)

(52) U.S. Cl.
USPC ......... 340/5.6; 340/5.61; 340/5.62; 340/5.63; 340/426.11; 340/426.13; 307/10.1; 307/10.2; 307/10.3; 307/10.5

(58) Field of Classification Search
USPC ................ 307/10.2–10.6; 340/5.1–5.7, 10.5, 340/426.11, 426.13, 426.17, 426.3, 426.35
See application file for complete search history.

(56) References Cited

U.S. PATENT DOCUMENTS

| | | | |
|---|---|---|---|
| 4,898,010 A | 2/1990 | Futami et al. | |
| 5,119,065 A | 6/1992 | Wiehagen | |
| 5,689,246 A * | 11/1997 | Dordick et al. | 341/21 |
| 5,869,908 A | 2/1999 | Moczygemba et al. | |
| 6,366,197 B1 | 4/2002 | Tarquinio | |
| 6,539,762 B1 | 4/2003 | Wittwer | |
| 6,542,071 B1 | 4/2003 | Ohtsubo et al. | |
| 6,583,715 B1 | 6/2003 | Benzie et al. | |
| 7,152,802 B2 | 12/2006 | Kell et al. | |

(Continued)

FOREIGN PATENT DOCUMENTS

| | | |
|---|---|---|
| DE | 102005035934 | 7/2005 |
| DE | 102005009185 | 9/2006 |

(Continued)

OTHER PUBLICATIONS

Partial European Search Report of EP App. No. 10 07 5086 dated Jun. 29, 2010.

(Continued)

*Primary Examiner* — Tai T Nguyen
*Assistant Examiner* — Ojiako Nwugo
(74) *Attorney, Agent, or Firm* — Rankin, Hill & Clark LLP (57) ABSTRACT

A smart communication system and method for a vehicle includes a master switch for toggling smart functionality on and off. An actuation signal is received by a control unit corresponding to a particular vehicle function. The actuation signal indicates that a corresponding actuating operation is occurring. The control unit determines whether the master switch is in an ON position. A key fob of the vehicle is confirmed to be within a search field of the vehicle when the master switch is determined to be in the ON position. The particular vehicle function is actuated when the key fob is confirmed to be within the search field; otherwise, manual actuation of the particular vehicle function is required.

27 Claims, 6 Drawing Sheets

U.S. PATENT DOCUMENTS

| | | | |
|---|---|---|---|
| 2004/0212338 A1* | 10/2004 | Shimizu et al. | 318/469 |
| 2004/0239186 A1* | 12/2004 | Emmerling et al. | 307/10.1 |
| 2005/0012593 A1* | 1/2005 | Harrod et al. | 340/5.72 |
| 2005/0033484 A1 | 2/2005 | Geber et al. | |
| 2005/0040933 A1 | 2/2005 | Huntzicker | |
| 2005/0099263 A1 | 5/2005 | Ikeda | |
| 2005/0151423 A1 | 7/2005 | Kito | |
| 2006/0220458 A1 | 10/2006 | Feldman et al. | |
| 2007/0200661 A1* | 8/2007 | Blum | 340/5.25 |
| 2009/0160639 A1* | 6/2009 | Chu | 340/539.11 |
| 2009/0259419 A1* | 10/2009 | Kasai | 702/63 |

FOREIGN PATENT DOCUMENTS

| | | |
|---|---|---|
| GB | 2436886 | 10/2007 |
| WO | 2006012936 | 2/2006 |
| WO | 2008117583 | 10/2008 |

OTHER PUBLICATIONS

European Search Report of European Patent Application No. 10075086.8 dated Sep. 20, 2010.

* cited by examiner

Fig. 10

SYSTEMS AND METHODS FOR CONTROLLING A SMART COMMUNICATION SYSTEM FOR A VEHICLE

This application claims the benefit of provisional patent application Ser. No. 61/159,593, filed Mar. 12, 2009, which is incorporated by reference in its entirety herein.

BACKGROUND

Exemplary embodiments herein relate broadly to systems and methods for controlling a smart communication system for a vehicle.

Some conventional vehicle smart communication systems (e.g., smart entry systems) utilize a key fob that provides a user entry to a vehicle when a search field identifies the key fob therein. The search field can be transmitted in response to a user input such as grasping an outer door handle, pressing a start button, closing a door, etc. In this manner, a user can immediately access his or her vehicle or activate functionality associated therewith simply by possessing the key fob within the search field. Once inside the vehicle, additional steps may be taken by the user to deliver power to the vehicle and/or to start the engine. In one example, the engine is started once an ignition control is actuated. This control can allow ignition activation when a rolling code emitted by the key fob is validated.

SUMMARY

In one aspect, a method is employed to secure a key fob within a vehicle. In the method according to this aspect, a master switch is toggled into an ON position to activate a smart communication system associated with the vehicle. A low frequency search field is transmitted from the vehicle to verify the key fob is within the search field and a signal is sent via the key fob to the vehicle. The key fob may be inserted into a key fob slot and vehicle power turned ON. A locking mechanism can then be engaged to secure the key fob within the key fob slot.

In another aspect, a method is used to secure a key fob within a vehicle. In the method according to this aspect, a master switch is toggled into an OFF position to deactivate a smart communication system associated with the vehicle. The key fob is inserted into a key fob slot and vehicle power is turned ON. A locking mechanism is engaged to secure the key fob within the key fob slot.

In yet another aspect, a method is employed to utilize a smart communication system within a vehicle. In the method according to this aspect, a master switch is toggled into an ON position to activate smart functionality of the smart communication system associated with the vehicle. A low frequency search field is transmitted from the vehicle to verify the key fob is within the search field and a signal is sent via the key fob to the vehicle. The key fob may be inserted into a key fob slot and vehicle power is turned ON. A locking mechanism within the key fob slot is maintained in an unlocked state.

In still another aspect, a smart communication method is provided for a vehicle having a master switch for toggling smart functionality on and off. In the method according to this aspect, an actuation signal is received corresponding to a particular vehicle function. The actuation signal indicates that a corresponding actuating operation is occurring. Whether the master switch is in an ON position is determined. A key fob of the vehicle is confirmed to be within a search field of the vehicle when the master switch is determined to be in the ON position. The particular vehicle function is actuated when the key fob is confirmed to be within the search field. Otherwise, manual actuation of the particular vehicle function is required.

In a further aspect, a smart communication method is provided for a vehicle having a master switch for toggling smart functionality on and off. In the method according to this aspect, a key fob is received in a key fob slot on the vehicle. Whether the master switch is in an ON position is determined. The key fob is locked in the key fob slot when the master switch is not determined to be in the ON position, otherwise the key fob is not locked in the key fob slot.

In still yet another aspect, a smart communication method is provided for a vehicle having a key fob slot for receiving a key fob. In the method according to this aspect, the key fob is received in the key fob slot. The key fob is locked in the key fob slot. An attempted removal of the key fob from the key fob slot is detected while the key fob is locked in the key fob slot.

In another aspect, a smart communication method is provided for a vehicle having a key fob slot for receiving a key fob. In the method according to this aspect, the key fob is received in the key fob slot. Whether vehicle power is ON is determined. The key fob is locked in the key fob slot when determined that the vehicle power is ON, otherwise the key fob is not locked in the key fob slot.

In still another aspect, a smart communication method for a vehicle is provided. In the method according to this aspect, an actuation signal is received corresponding to starting of an engine of the vehicle. Whether a master switch for toggling smart functionality of the vehicle is in an ON position is determined. A key fob of the vehicle is confirmed to be within a search field of the vehicle when the master switch is determined to be in the ON position. Whether the key fob is in a key fob slot of the vehicle is determined when the master switch is not determined to be in the ON position. The engine is started when one of: the key fob is confirmed to be within the search field when the master switch is determined to be in the ON position, or the key fob is determined to be in the key fob slot when the master switch is not determined to be in the ON position.

In still yet another aspect, a smart communication system for a vehicle is provided. More particularly, in accordance with this aspect, the smart communication system includes an engine start actuator for generating an engine start signal and a control unit onboard the vehicle for receiving the engine start signal from the engine start actuator. A master switch is connected to the control unit for toggling smart functionality of the vehicle. An onboard transmitter is connected to the control unit for sending request signals to a portable device. The onboard transmitter sends a request signal within a search field when an engine start signal is received by the control unit and the master switch is in an ON position. An onboard receiver is connected to the control unit for receiving a confirmation signal from the portable unit that is responsive to the request signal. A key fob slot is provided on the vehicle for receiving a key fob and is connected to the control unit. The control unit is configured to start the engine when at least one of: the onboard receiver receives the confirmation signal responsive to the request signal and the master switch is in the ON position, or the key fob is determined to be in the key fob slot and the master switch is in an OFF position.

DETAILED DESCRIPTION

Figure 1:
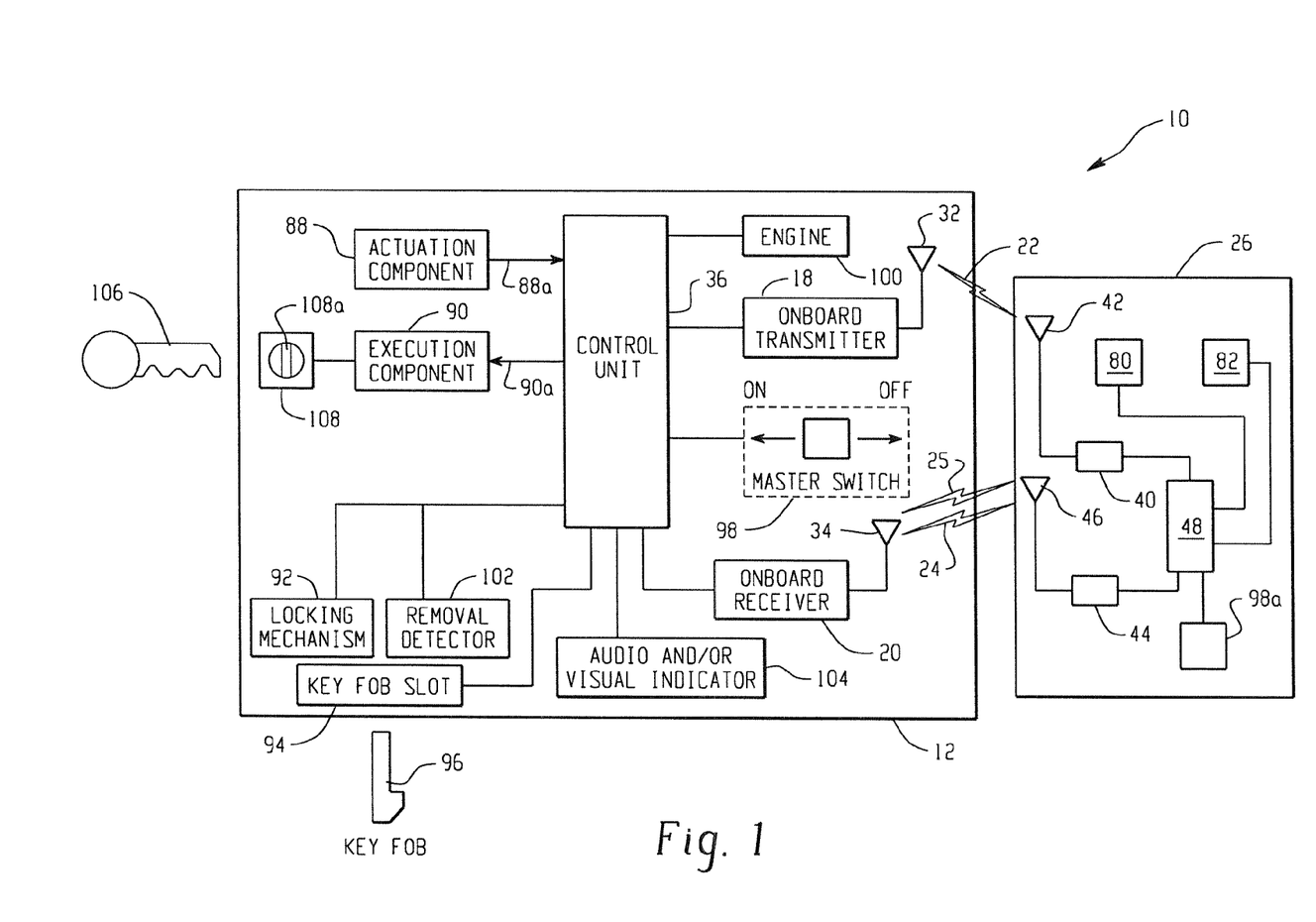
FIG. 1 is a schematic diagram showing an exemplary embodiment of a smart communication system for a vehicle.

Referring now to the drawings, wherein the showings are for purposes of illustrating one or more exemplary embodiments, FIG. 1 schematically illustrates a smart communication system 10 for a vehicle 12. As shown, the system 10 can include an onboard transmitter 18 and an onboard receiver 20. As will be described in more detail below, the onboard receiver 20 is for receiving an actuation or activation signal 24 from a portable device 26 (or other source) and the onboard transmitter 18 is for sending a request or verification signal 22 to the portable device 26 to request appropriate identification therefrom. The onboard receiver 20 is also for receiving a confirmation signal 25 from the portable device 26 that is responsive to the verification signal 22.

The system 10 can further include a controller or control unit 36, which is operatively connected to the transmitter 18 and the receiver 20. Through the control unit 36, the actuation signal 24 can initiate a handshake communication wherein the system 10 verifies the portable device 26 is within a predetermined distance from the vehicle 12. When verified, the control unit 36 can send a command signal 90a to an execution component 90 to initiate an action based upon the actuation signal 24 received from the portable device 26. The execution component 90 can be a motor, a power lock, etc. that executes the command received from the control unit 36 to carryout the particular vehicle function.

Figure 2:
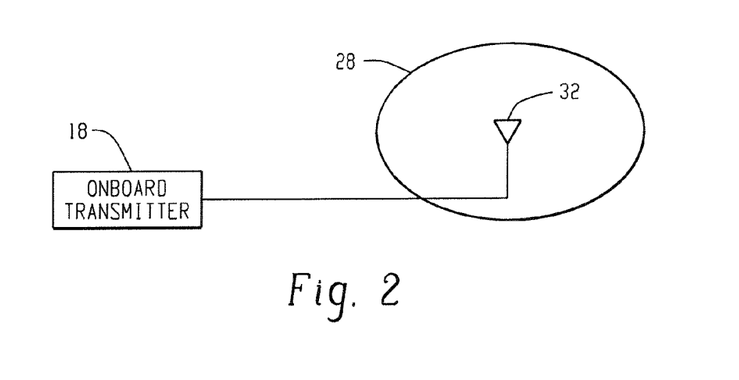
FIG. 2 is a schematic diagram of an onboard transmitter of the smart communication system of FIG. 1 transmitting a LF signal within a search field.

More particularly, with additional reference to FIG. 2, once the actuation signal 24 is received from the portable device 26 (or some other actuation signal is received), the onboard transmitter 18 can send the verification signal 22 (e.g., at a low frequency) within a search field 28. In one example, the actuation signal 24 (or some other actuation signal) is initiated by a corresponding actuation operation, such as touching a door, pulling a door handle, opening a door, unlocking a door, pressing an engine start button or closing the door of the vehicle. The actuation signal 24 (or some other actuation signal) and the corresponding actuation operation can correspond to a particular vehicle function, such as unlocking/locking a vehicle door, opening/closing a vehicle window or powered door, starting an engine of the vehicle, etc.

The onboard transmitter 18 can include an antenna 32 for transmitting the verification signal 22. It is to be appreciated that the verification signal 22 (and the search field 28) can radiate from the antenna 32 in all directions, though (and not shown) some directions may be stronger than others. Similarly, the onboard receiver 20 can include an antenna 34 for receiving actuation signal 24 and the confirmation signal 25 from the portable device 26. Power can also be appropriately provided to the antenna 32 to allow communication only within the search field 28 of a desired radius or area. It is to be appreciated that other embodiments of the present disclosure may employ different quantities and powers of antennas.

Alternatively or in addition, the control unit 36 can receive an input (e.g., actuation signal 88a) from an actuation component 88 corresponding to a particular vehicle function to initiate the particular function of the vehicle 12. The actuation component 88 can be a dial, switch, push button, etc. on the vehicle 12 that initiates a particular vehicle function such as unlocking or locking a door, opening or closing a window, starting an engine, etc. In particular, the actuation signal 88a can indicate that a corresponding actuation operation is occurring. The corresponding actuation operation can be the actuation of the actuation component 88. For example, the actuation operation can be depression of the actuation component 88 when the actuation component 88 is a button. While the illustrated embodiment shows only a single actuation component, it is to be appreciated that any number of actuation components can be employed in the smart communication system 10. By this arrangement (i.e., receiving actuation signal 24 from the portable device 26 and/or receiving actuation signal 88a from the actuation component 88), commands can be received by the vehicle 12 via both hard wired and wireless communication protocols.

In one exemplary embodiment, the actuation component 88 is an engine start actuation (e.g., a push button engine start actuator) that generates the actuation signal 88a as an engine start signal. In this embodiment, the particular vehicle function is starting of engine 100 of the vehicle 12, and the signal 88a indicates that actuation of the engine start actuator 88 (e.g., depression of the engine start actuator) is occurring. The control unit 36 receives the engine start signal 88a from the engine start actuator 88 in this embodiment and then can send the verification signal 22 to the portable device 26 to confirm that the portable device 26 is within the search field 28. Confirmation that the portable device 26 is within the search field 28 can occur by the portable device 26 receiving the verification signal 22 and responding with the confirmation signal 25.

A key fob slot 94 can be provided on the vehicle 12 for receiving a key fob 96. A locking mechanism 92 can be associated therewith for selectively locking the key fob 96 in the key fob slot 94. The key fob slot 94 and the locking mechanisms 92 can be coupled to the control unit 36. The key fob slot 94 facilitates a key fob 96 to be inserted thereto. For illustrative purposes, the key fob 96 is shown as a component separate from the portable device 26. It is to be appreciated, however, the portable device 26 and the key fob 96 can be the same component. Therefore, components (and functions associated therewith) related to the portable device 26 and the key fob 96 are interchangeable.

Once the key fob 96 is in the key fob slot 94, locking mechanism 92 can mechanically engage the key fob 96 to prevent removal of the key fob 96. Activation of the locking mechanism 92 can be dependent on any number of factors such as whether the smart functionality of the smart communication system 10 is active, power is turned ON in the vehicle, an accessory switch is on, etc. In one example, the locking mechanism 92 engages the key fob 96 anytime power is ON within the vehicle. In another example, the locking mechanism 92 engages the key fob 96 whenever the smart functionality of the system 10 is in an active state. As described in greater detail below, the smart functionality of the system 10 can be turned ON and OFF via a master switch 98, which can be connected to the control unit 36 for toggling smart functionality of the vehicle 12. The master switch 98 can be implemented through either hardware or software. For example, it is to be appreciated by those skilled in the art that the master switch 98 can be either a physical switch, or realized in software and communicated via some vehicle communication system (e.g., CAN, ISO9141, etc.) In yet another example, the locking mechanism 92 engages the key fob 96 only when the master switch 98 is in the OFF position. Locking and unlocking of the key fob 96 within the key fob slot 94 by the locking mechanism 92 can be controlled by the control unit 36 as will be described in more detail below.

The system 10 can further include a removal detector 102 that detects attempted removal of the key fob 96 from the key fob slot 94 while the key fob 96 is locked in the key fob slot 94 by the locking mechanism 92. The removal detector 102 can, in one embodiment, detect when a removal force is applied to the key fob 96 while the key fob 96 is locked in the key fob slot 94. For example, the removal detector 102 could be or include a strain gauge that determines when a removal force is being applied to the key fob 96. Alternatively, the removal detector 102 can be or include a switch that detects partial removal of the key fob 96 from the key fob slot 94. For example, relative movement between the key fob 96 and the key fob slot 94 could trigger the removal detector 102 when configured as a switch. An indicator 104, which can be an audio and/or visual indicator, can be provided on the vehicle 12 for alerting the driver that the removal detector 102 has detected an attempted removal of the key fob 96 from the key fob slot 94 while the key fob 96 is locked within the key fob slot 94 by the locking mechanism 92.

The portable device 26 can include a portable transmitter 44 having an antenna 46 for sending the actuation signal 24 and/or the confirmation signal 25 to the vehicle 12, and particularly to the onboard receiver 20. The portable device 26 can also include a portable receiver 40 having an antenna 42 for receiving the verification signal 22. The portable device 26 can further include a controller or control unit 48 for coordinating communication and operations between the receiver 40 and the transmitter 44. The control unit 48 can be coupled to a first button 80 and a second button 82 to emit a signal from the transmitter 44. Optionally, master switch 98a can be provided on the portable device 26 in substitution for (or in addition to) the master switch 98 on the vehicle 12. In one example, the master switch 98a is a button on the portable device 26 that toggles smart functionality of the system 10 as described in reference to the master switch 98 on the vehicle 12.

Alternatively or in addition, other means or methods can be used to initiate an actuation signal (e.g., moving the portable unit 26 in a specified manner). In the illustrated embodiments, the buttons 80,82 can activate particular functionality such as lock and unlock respectively by depressing each button one or more times. The functionality of the buttons 80, 82, 98a can vary based on the number of times or combination the buttons 80, 82, 98a is pressed. It is to be appreciated that the portable device 26 can be configured to allow disparate button combinations and/or number of button pushes to relate to the opening or closing or specific windows. Further configuration can allow such actuation to occur only when the portable device 26 is within a predefined radius relative to the vehicle 12.

The size of the search field or radius 28 can be related to a number of factors such as vehicle size, number of windows, type of windows, wireless configuration, make, model, geographic location, etc. In one example, the vehicle 12 has a plurality of settings that relate to the type of passengers expected to use the vehicle. In one case, a child setting can disable window closure functionality of the portable device 26. In another case, a normal setting allows window closure as long as the portable device 26 is within a predetermined radius (e.g., six meters) of the vehicle 12.

In one embodiment, the locking mechanism 92 is activated when the smart functionality of the system 10 is ON, as determined by the selected state of the master switch 98 (or the switch 98a). If the master switch 98 is in the ON position, the system 10 transmits the search field 28 (e.g., 120 KHz) to search for the key fob 96 in response to an input received via the buttons 80, 82 and/or the actuation component 88. If, however, the master switch 98 is in an OFF position, the search field 28 can be disabled. The user can use the buttons 80, 82 on the portable device 26 (or via a hidden mechanical key) to lock/unlock the doors of the vehicle 12. The key fob 96 can be inserted into the key fob slot 94, which can be disposed on an instrument or dashboard panel of the vehicle 12. Once the key fob 96 is in the key fob slot 94, in one embodiment, it is locked into place anytime vehicle power (e.g., accessory power, full ignition power, etc.) is ON. In this aspect, the key fob 96 does not unlock from the key fob slot 94 until power is turned completely OFF. Furthermore, the user can insert the key fob 96 into the key fob slot 94, and it will lock when power is ON, regardless of the state of the master switch 98. In some cases, the user may fail to turn power OFF before attempting to remove the key fob 96 from the key fob slot 94. In this circumstance, the locking mechanism 92 of the key fob slot 94 is engaged to prevent removal of the key fob 96 inserted therein.

In another exemplary embodiment, the smart functionality of the system 10 may be turned OFF via the master switch 98. The key fob 96 may be inserted in the key fob slot 94 (e.g., to start the engine 100 of the vehicle 12). Once the key fob 96 is in the key fob slot 94, it is locked into place anytime vehicle power (e.g., accessory power, full ignition power, etc.) is ON. In this aspect, the key fob 96 does not unlock from the key fob slot 94 until power is turned completely OFF. When the master switch 98 is in the ON position, meaning the smart functionality of the system 10 is ON, the key fob 96 does not lock into the key fob slot 94. Instead, the user can remove the key fob 96 at any time during driving.

Thus, when the smart functionality of the system 10 is active, the user does not need to put the key fob 96 in the key fob slot 94 to start the vehicle 12 because the key fob 96 is located and identified by the search field 28. In this mode, the key fob slot 94 becomes essentially a holder for the key fob 96. Moreover, the applicable regulations set forth by the U.S. Dept. of Transportation (e.g., under FMVSS114) can be met because there is no need to lock the key fob slot 94. As a result, a user is prevented from damaging the key fob slot 94 since the locking mechanism 92 is not activated when the smart functionality of the system 10 is in an ON mode.

In still another exemplary embodiment, the control unit 36 can be configured to start the engine 100 when at least one of: the onboard receiver 20 receives the confirmation signal 25 responsive to the request signal 22 and the master switch 98 is in the ON position, or the key fob 96 is determined to be in the key fob slot 94 and the master switch 98 is in the OFF position. The request signal 22 can be sent when an engine start signal 88a is received by the control unit 36 and the master switch is in the ON position. The control unit 36 can further be configured to actuate the locking mechanism 92 to lock the key fob 96 in the key fob slot 94 when the key fob 96 is in the key fob slot 94 and the engine start signal 88a is received. The key fob 96 is not locked in the key fob slot 94, however, by the locking mechanism 92 when the master switch 98 is in the ON position in this embodiment.

Figure 3:
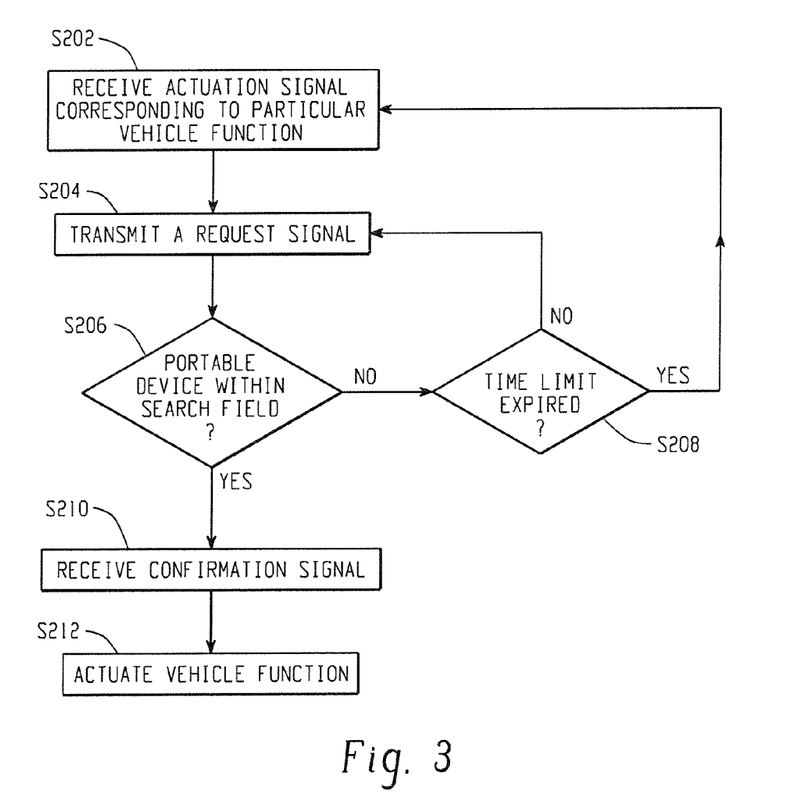
FIG. 3 is an exemplary embodiment of a smart communication method.

With reference to FIG. 3, a known smart communication method is illustrated for a vehicle. The smart communication method of FIG. 3 can be used with the smart communication system 10 depicted in FIG. 1 and will be described with reference thereto, though this is not required. In S202, an actuation signal, such as signal 24 from portable device 26 or signal 88a from actuation component 88, is received by the control unit 36 corresponding to a particular vehicle function (e.g., locking or unlocking a vehicle door, opening or closing a vehicle window, starting the engine 100 of the vehicle, etc.). The actuation signal indicates that a corresponding actuating operation is occurring, such as a user pressing one of the buttons 80 or 82 on the portable device 26, a user actuating the actuation component 88 (e.g., pushing an engine start button), etc.

When smart functionality is enabled, request signal 22 is transmitted by the onboard transmitter 18 of the vehicle 12 in S204. Next, in S206, a determination is made as to whether portable device 26 is within search field 28. For example, the onboard transmitter 18 can send verification signal 22 to the portable device 26. When the portable device 26 is within the search field 28 and receives the verification signal 22, the portable device 26 can send the confirmation signal 25, which is received by the onboard receiver 20 in S210 to confirm that the portable device 26 is within the search field 28. If no confirmation signal 25 is received by the onboard receiver 20, a determination is made in S208 as to whether a time limit has expired. The time limit can be a short period of time, such as five seconds, for example. If the time limit has not expired in S208, the request signal 22 can continue to be sent out in S204. However, if the time limit has expired in S208, the method returns to S202 to wait for another actuation signal, such as actuation signal 24 or 88a. When determined that the portable device is within the search field in S206, the confirmation signal 25 is received by the onboard receiver 20 in S210. After receipt of the confirmation signal in S210, the control unit 36 can actuate the vehicle function in S212. For example, the control unit can send command signal 90a to an execution component 90.

Figure 4:
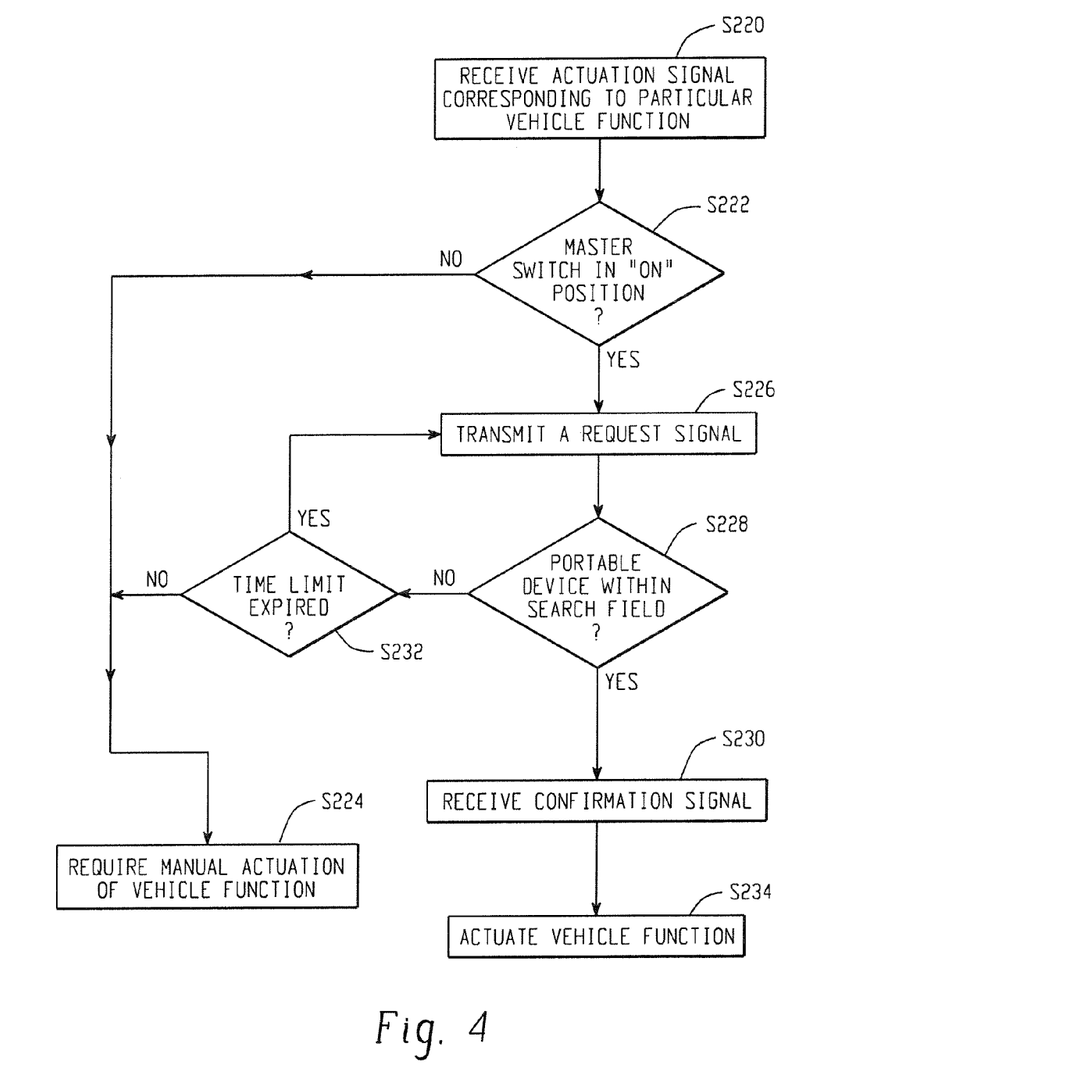
FIG. 4 is an exemplary embodiment of a smart communication method determining whether a master switch is in an ON position.

With reference to FIG. 4, an exemplary smart communication method is shown for a vehicle having a master switch, such as switch 98 or 98a, for toggling smart functionality on and off within the vehicle. The method of FIG. 4 can be used with the smart communication system 10 depicted in FIG. 1 and will be described with reference thereto, though this is not required. In S220, an actuation signal, such as actuation signal 24 or 88a, is received corresponding to a particular vehicle function (e.g., unlocking or locking a vehicle door or doors, opening or closing a vehicle window, starting the engine 100 of the vehicle, etc.). The actuation signal 24 or 88a specifically indicates that a corresponding actuating operation is occurring (e.g., buttons 80 or 82 being depressed, depression of an engine start actuator, etc.). In S222, a determination is made as to whether the master switch 98 or 98a is in an ON position. The master switch 98 or 98a toggles smart functionality on and off for the vehicle 12. When the master switch 98 or 98a is ON, smart functionality is turned ON and the vehicle 12 searches for the portable device 26 within the search field 28 when particular vehicle functions provided for within the smart functionality are initiated.

When the master switch 98 or 98a is OFF, smart functionality for the vehicle 12 is turned OFF and no such searching for the portable device 26 within the search field 28 occurs. Accordingly, if the master switch 98 or 98a is not in the ON position in S222, manual actuation of the vehicle function is required in S224. For example, when the particular vehicle function is unlocking of the vehicle doors and the actuating operation corresponding to this particular vehicle function is pulling on a door handle to initiate the actuation signal, no searching for the portable device 26 within the search field 28 occurs; instead, manual actuation is required. This could include inserting a key 106 into a lock device on the vehicle 28 for mechanically unlocking the vehicle door (FIG. 1). Alternatively, when the particular vehicle function is starting of the vehicle engine and the corresponding actuating operation is depression of an engine start button, manual actuation of the vehicle function in S224 could include inserting the key fob 96 into the key fob slot 94 or could include inserting a key into an ignition cylinder of the vehicle 12.

When the master switch 98 or 98a is in the ON position in S222, request signal 22 is transmitted by the onboard transmitter 18 in S226. In S228, a determination is made as to whether the portable device 26 is within the search field 28. If yes, a confirmation signal 25 is received by the onboard transmitter 20 from the portable device 26 in S230. If no in S228, and a time limit has not expired as determined in S232, the request signal 22 is continuously sent out in S226. If the time limit has expired in S232, manual actuation of a vehicle function is required in S224 or a new actuation signal 22 or 88a is required in S220. Should a confirmation signal 25 be received in S230, the vehicle function is actuated in S234.

According to the method of FIG. 4, manual actuation of the vehicle function is required in S224 when at least one of: the master switch 98 or 98a is not determined to be in the ON position in S222 or the key fob 96 is not confirmed to be within the search field 28 in S228. When the particular vehicle function is unlocking doors of the vehicle 12, the manual actuation required in S224 can be at least one of pressing a button actuator to unlock the doors (e.g., buttons 80 or 82) or receiving a mechanical key 106 in the key slot 108a followed by unlocking rotation of the mechanical key 106. When the particular vehicle function is starting of the engine 100 of the vehicle 12, the manual actuation required in S224 can be receiving the key fob 96 in the key fob slot 94 prior to receipt of the actuation signal. As will be described in more detail below, the key fob 96 can be locked in the key fob slot 94 by the locking mechanism 92 when the master switch 98 or 98a is not determined to be in the ON position in S222.

Figure 5:
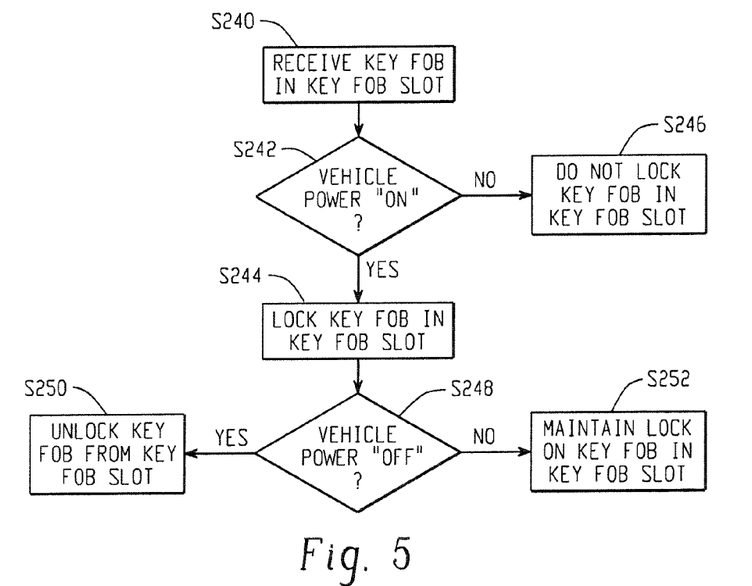
FIG. 5 is an exemplary embodiment of a method for selectively locking a key fob in a key fob slot depending on the status of vehicle power.

With reference to FIG. 5, a smart communication method is illustrated for a vehicle having a key fob slot for receiving a key fob. The method shown in FIG. 5 can be used in the smart communication system 10 of FIG. 1 and will be described with reference thereto, though this is not required. In the method, the key fob 96 is received in the key fob slot 94 in S240. In S242, a determination is made as to whether vehicle power is ON. The key fob 96 is locked in the key fob slot 94 in S224 when determined that the vehicle power is ON in S242; otherwise, the key fob 96 is not locked in the key fob slot 94 in S246. By way of example, vehicle power is determined to be ON when an ignition state of the vehicle is in at least one of an accessory state or a run state. In S248, a determination is made as to whether vehicle power is turned OFF after the key fob 96 is locked in the key fob slot 94 in S244. The key fob 96 is unlocked from the key fob slot 94 in S250 when determined that the vehicle power is turned OFF in S248; otherwise, the lock on the key fob 96 and the key fob slot 94 is maintained in S252.

Figure 6:
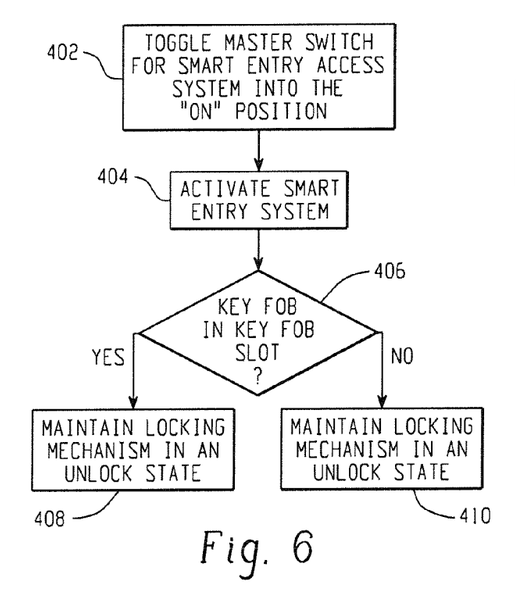
FIGS. 6 and 7 are exemplary embodiments of a method utilizing a smart communication system related to a key fob slot locking mechanism.
Figure 7:
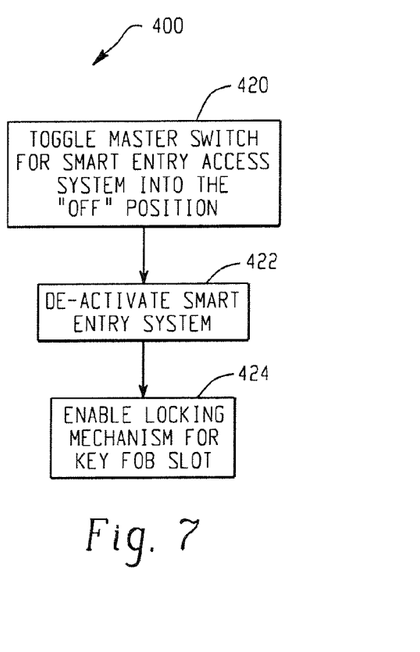

FIGS. 5 and 6 illustrate a method 400 to utilize the smart entry system related to a key fob slot locking mechanism (e.g., locking mechanisms 92). At 402, the master switch is toggled to the ON position and at 404 a smart entry system (e.g., smart entry system 10) is activated to allow vehicle access. A check to verify the key fob is in the key fob slot is made at 406. As the smart entry system is activated via the master switch, the locking mechanism remains in an unlock state at 408 and 410 regardless of whether the key fob is within the key fob slot. One benefit to such configuration is to prevent damage of the locking mechanism. In one example, removal of the key fob from the key fob slot may be attempted when the locking mechanism is engaged, thereby damaging or otherwise compromising the functionality of the locking mechanism. By disengaging the locking mechanism, such damage can be avoided.

In another scenario, a user may wish to lock the key fob slot wherein the system operates as a normal ignition system. In this case, at 420, the master switch is toggled to the OFF position and, at 422, the smart entry system (e.g., smart entry system 10) is deactivated. The locking mechanism is enabled at 424 thereby locking the key fob when placed into the key fob slot. In this manner, vehicle entry can occur as it would be a mechanical key, or standard remote keyless entry.

Figure 8:
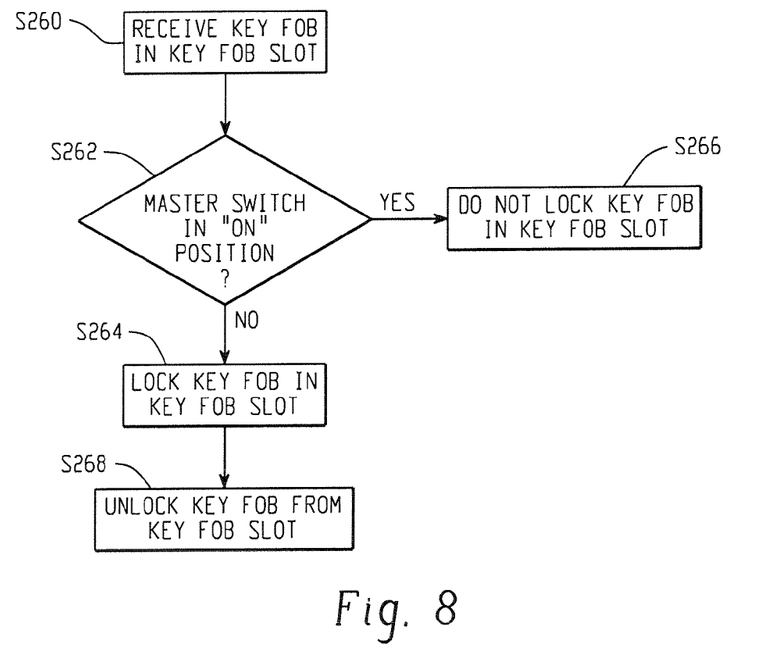
FIG. 8 is an exemplary embodiment of a method for selectively locking a key fob in a key fob slot depending on the position of a master switch.

With reference to FIG. 8, a smart communication method is illustrated for a vehicle having a master switch for toggling smart functionality on and off. The method shown in FIG. 8 can be used with the smart communication system 10 of FIG. 1 and will be described with reference thereto, though this is not required. In the method, the key fob 96 is received in the key fob slot 94 on the vehicle 12 in S260. In S262, a determination is made as to whether the master switch 98 or 98*a* is in the ON position. The key fob 96 is locked in the key fob slot 94 in S264 when the master switch 98 or 98*a* is determined to be in the ON position in S262; otherwise, the key fob 96 is not locked in the key fob slot 94 in S266. In one exemplary embodiment, locking of the key fob 96 in the key fob slot 94 in S264 occurs only when vehicle power is ON. In S268, the key fob 96 can be unlocked from the key fob slot 94. In one exemplary embodiment, such unlocking of the key fob 96 from the key fob slot 94 in S268 occurs only when the vehicle power is OFF.

Figure 9:
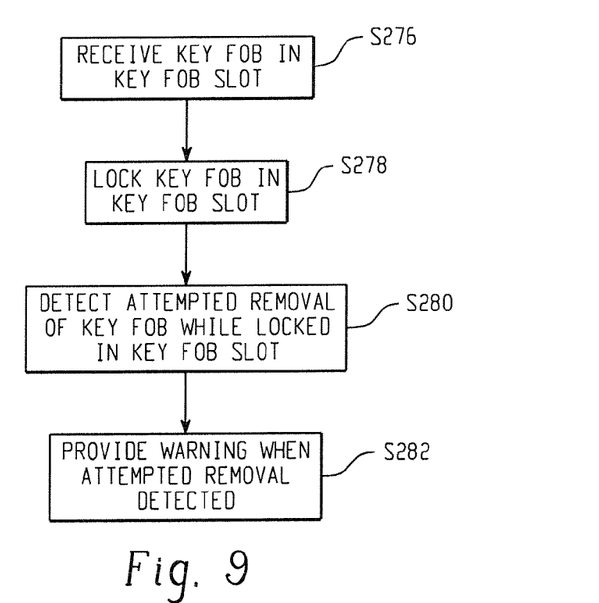
FIG. 9 is an exemplary embodiment of a method for detecting attempted removal of a key fob while locked in a key fob slot and providing a warning when an attempted removal is detected.

With reference to FIG. 9, a smart communication method is illustrated for a vehicle having a key fob slot for receiving a key fob. The method of FIG. 9 can be used with the smart communication system 10 of FIG. 1 and will be described with particular reference thereto, though this is not required. In the method, the key fob 96 is received in the key fob slot 94 in S276. The key fob 96 is locked in the key fob slot 94 in S278. Any attempted removal of the key fob 96 from the key fob slot 94 while the key fob 96 is locked in the key fob slot 94 is detected in S280. Detecting an attempted removal from the key fob slot 96 in S280 can include detecting a removal force being applied to the key fob 96 while the key fob 96 is locked in the key fob slot 94. This can include using a strain gauge to determine when the removal force is being applied to the key fob 96. Alternately, detecting attempting removal in S280 can include detecting partial removal of the key fob 96 from the key fob slot 94 by a switch. For example, relative movement between the key fob 94 and the key fob slot 96 could actuate a switch to indicate that an attempted removal is occurring.

A warning can be provided in S282 when an attempted removal is detected in S280 to notify the driver that further removal could damage the key fob 96. The provided warning in S282 can be at least one of an audio or visual warning in the vehicle (e.g., an illuminated message, a light indicator, a beeper or buzzer, etc.). In an exemplary embodiment, the key fob 96 is only locked in the key fob slot 94 in S278 when a master switch 98 or 98*a* for toggling smart functionality on and off is in an OFF position. Locking of the key fob slot in S278 can further be limited to only locking the key fob 96 in the key fob slot 94 when the master switch 98 or 98*a* is in the OFF position and vehicle power is ON.

The steps of detecting attempted removal of the key fob 96 while locked in the key fob slot 94 and providing a warning when attempted removal is detected can be applied to any of the other methods and embodiments described herein. For example, with brief reference to FIG. 8, an attempted removal of the key fob 96 from the key fob slot 94 can be detected while the key fob 96 is locked in the key fob slot 94 in S264 by at least one of detecting a removal force being applied to the key fob 96 or detecting relative movement between the key fob 96 and the key fob slot 94. When so detected, a warning as described in S282 of FIG. 9 can be provided to prevent damage to the key fob 96.

Figure 10:
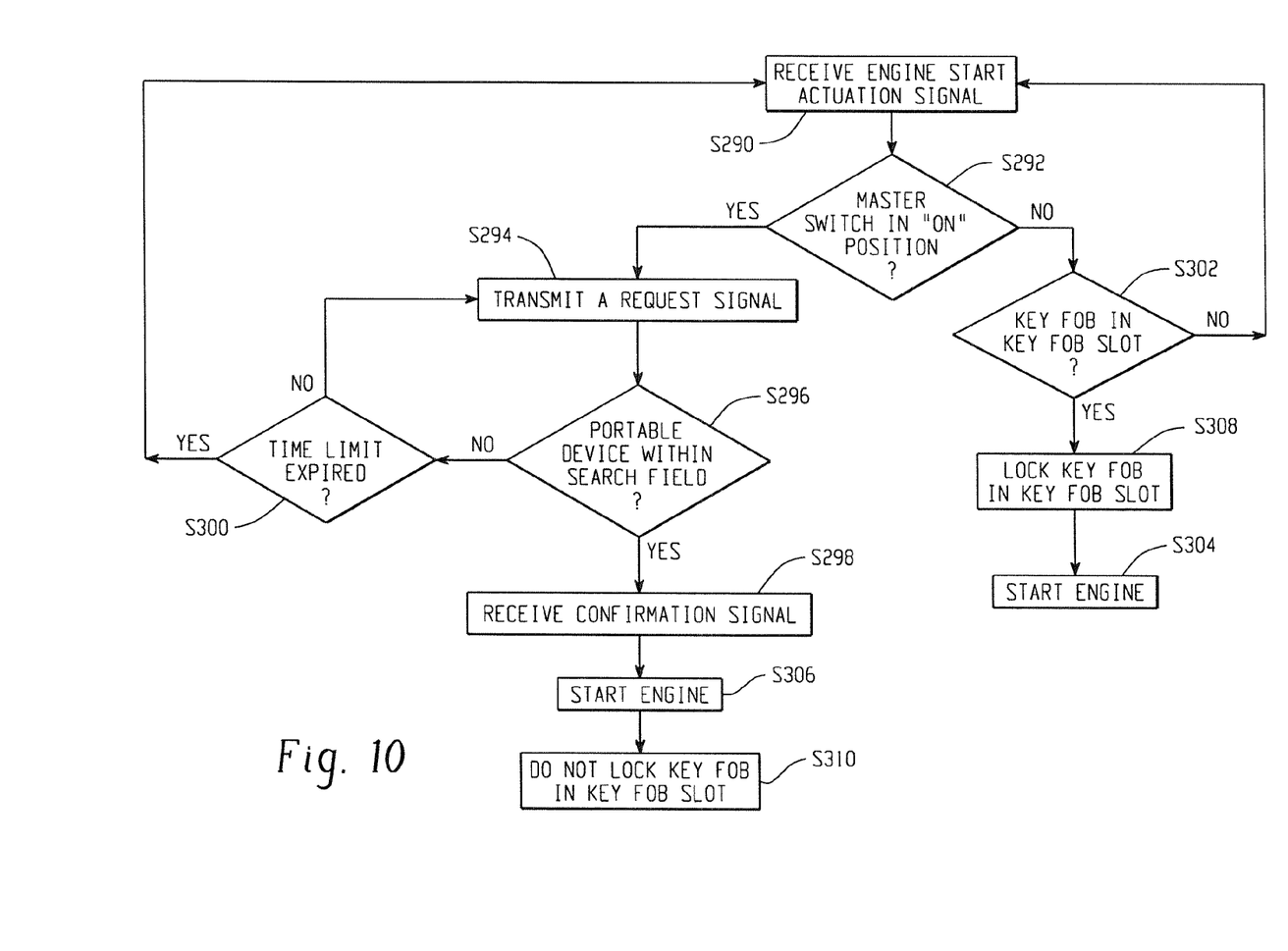
FIG. 10 is an exemplary embodiment of a smart communication method for starting the engine of a vehicle.

With reference to FIG. 10, a smart communication method is illustrated for a vehicle. The method illustrated in FIG. 10 can be applied to the smart communication system 10 of FIG. 1 and will be described with particular reference thereto, though this is not required. In the method, an actuation signal 88*a* corresponding to starting of the engine 100 of the vehicle 12 is received in S290. To trigger the actuation signal 88*a*, the actuation component 88 can be actuated. For example, the actuation component 88 can be a push button for starting the engine 100. Upon depression thereof, the actuation component 88 sends the actuation signal 88*a* to the control unit 36. The control unit 36 then determines whether the master switch 98 or 98*a* for toggling the smart functionality of the vehicle 12 is in the ON position in S292.

When the master switch 98 or 98*a* is in the ON position in S292, the key fob 96 of the vehicle 12 is confirmed to be within the search field 28. In particular, such confirmation can include transmitting a request signal 22 to a portable device 26 in S294. A determination is then made in S296 as to whether the portable device 26 is within the search field 28. If the portable device 26 is within the search field 28, a confirmation signal 25 is received from the portable device 26 in S298. If the portable device 26 is not confirmed to be within the search field 28 in S296, a determination is made as to whether a time limit has expired in S300. Provided the time limit has not expired in S300, the request signal 22 is continuously transmitted in S294. However, if the time limit has expired in S300, the method returns to S290.

When the master switch 98 or 98*a* is not in the ON position as determined in S292, a determination is made as to whether the key fob 96 is in the key fob slot 94 of the vehicle 12 in S302. The engine is generally started when one of: the key fob 96 is confirmed to be within the search field 28 when the master switch 98 or 98*a* is determined to be in the ON position or the key fob 96 is determined to be in the key fob slot 94 when the master switch 98 or 98*a* is not determined to be in the ON position. In particular, the engine is started in S306 when the key fob 96 is confirmed to be within the search field 28 and the master switch 98 or 98*a* is determined to be in the ON position. In S304, the engine is started when the key fob 96 is determined to be in the key fob slot 94 (S302) and the master switch 98 or 98*a* is not determined to be in the ON position. Optionally, the key fob 96 can be locked in the key fob slot 94 in S308 when the master switch 98 or 98*a* is not determined to be in the ON position prior to starting of the engine in S304. Notably, as indicated in S310, the key fob 96 is not locked in the key fob slot 94 when the master switch 98 or 98*a* is determined to be in the ON position in S292.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in common elements and/or components, or separated, where appropriate. For example, the control unit 36 could be distributed throughout the system 10. It is also to be appreciated that different aspects of the exemplary embodiments may be selectively employed as appropriate to achieve other alternative embodiments suited for desired applications, the other alternate embodiments thereby realizing the respective advantages of the aspects incorporated herein.

It is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A smart communication method for a vehicle having a master switch that is manually operable for toggling smart functionality on and off, comprising:
   receiving an actuation signal corresponding to a particular vehicle function, said actuation signal indicating that a corresponding actuating operation is occurring;
   determining whether the master switch is in an ON position, the master switch manually operable for toggling smart functionality on and off for the vehicle;
   upon receiving the activation signal, wirelessly confirming a key fob of the vehicle is within a search field of the vehicle when the master switch is determined to be in said ON position and actuating said particular vehicle function when said key fob is confirmed to be within said search field; and
   requiring manual actuation of said particular vehicle function when at least one of said master switch is determined not to be in said ON position or said key fob is not confirmed to be in said search field.

2. The smart communication method of claim 1 wherein said particular vehicle function is unlocking doors of the vehicle and said manual actuation is at least one of pressing a button actuator to unlock said doors or receiving a mechanical key in a key slot followed by unlocking rotation of said mechanical key.

3. The smart communication method of claim 1 wherein said particular vehicle function is starting an engine of the vehicle and said manual actuation is receiving said key fob in a key fob slot prior to receipt of said actuation signal.

4. The smart communication method of claim 3 further including:
   locking said key fob in said key fob slot when said master switch is determined not to be in said ON position.

5. The smart communication method of claim 1 wherein confirming said key fob of the vehicle is within said search field includes:
   transmitting a low frequency request signal within said search field; and
   receiving a confirmation signal from said key fob confirming that said key fob is within said search field.

6. A smart communication method for a vehicle having a master switch for toggling smart functionality on and off, comprising:
   receiving a key fob in a key fob slot on the vehicle;
   determining whether the master switch is in an ON position; and
   locking said key fob in said key fob slot when the master switch is determined not to be in the ON position, otherwise not locking said key fob in said key fob slot.

7. The smart communication method of claim 6 wherein said locking of said key fob in said key fob slot occurs only when said vehicle power is ON.

8. The smart communication method of claim 7 wherein said vehicle power is ON when an ignition state is at least one of an accessory state or a run state.

9. The smart communication method of claim 7 further including:
   unlocking said key fob from said key fob slot when said vehicle power is OFF.

10. The smart communication method of claim 6 further including:
    detecting an attempted removal of the key fob from the key fob slot while the key fob is locked in the key fob slot by at least one of detecting a removal force being applied to the key fob or detecting relative movement between said key fob and said key fob slot.

11. The smart communication method of claim 10 further including providing a warning when said attempted removal is detected to prevent damage to said key fob.

12. A smart communication method for a vehicle having a key fob slot for receiving a key fob, comprising: receiving the key fob in the key fob slot; locking the key fob in the key fob slot; and detecting an attempted removal of the key fob from the key fob slot only while the key fob is locked in the key fob slot; and wherein the key fob is only locked in the key fob slot when a master switch for toggling smart functionality on and off is in an OFF position.

13. The smart communication method of claim 12 wherein the key fob is only locked in the key fob slot when said master switch is in said OFF position and vehicle power is ON.

14. The smart communication method of claim 12 wherein detecting attempted removal includes detecting a removal force being applied to the key fob while the key fob is locked in the key fob slot.

15. The smart communication method of claim 14 wherein detecting said removal force includes using a strain gauge to determine when said removal force is being applied to the key fob.

16. The smart communication method of claim 12 wherein detecting attempted removal includes detecting partial removal of the key fob from the key fob slot by a switch.

17. The smart communication method of claim 12 further including:

providing a warning when said attempted removal is detected to notify that further removal could damage the key fob.

18. The smart communication method of claim 17 wherein said warning is at least one of an audio or visual warning in the vehicle.

19. A smart communication method for a vehicle having a key fob slot for receiving a key fob, comprising:
   receiving the key fob in the key fob slot;
   determining whether vehicle power is ON; and
   locking the key fob in the key fob slot when determined that said vehicle power is ON, otherwise not locking the key fob in the key fob slot.

20. The smart communication method of claim 19 wherein said vehicle power is determined to be ON when an ignition state of the vehicle is in at least one of an accessory state or a run state.

21. The smart communication system of claim 19 further including:
   determining whether vehicle power is turned OFF after the key fob is locked in the key fob slot; and
   unlocking said key fob from said key fob slot when determined that said vehicle power is turned OFF.

22. A smart communication method for a vehicle, comprising:
   receiving an actuation signal corresponding to starting of an engine of the vehicle;
   determining whether a master switch for toggling smart functionality of the vehicle is in an ON position;
   confirming a key fob of the vehicle is within a search field of the vehicle when said master switch is determined to be in said ON position;
   determining whether said key fob is in a key fob slot of the vehicle when said master switch is not determined to be in said ON position;
   starting said engine when one of:
      said key fob is confirmed to be within said search field when said master switch is determined to be in said ON position, or
      said key fob is determined to be in said key fob slot when said master switch is not determined to be in said ON position.

23. The smart communication method of claim 22 further including:
   locking said key fob in said key fob slot when said master switch is not determined to be in said ON position prior to starting said engine.

24. The smart communication method of claim 23 wherein said key fob is not locked in said key fob slot when said master switch is determined to be in said ON position.

25. A smart communication system for a vehicle, comprising:
   an engine start actuator for generating an engine start signal;
   a control unit onboard the vehicle for receiving said engine start signal from said engine start actuator;
   a master switch connected to said control unit for toggling smart functionality of the vehicle;
   an onboard transmitter connected to said control unit for sending request signals to a portable device, said onboard transmitter sending a request signal within a search field when an engine start signal is received by said control unit and said master switch is in an ON position;
   an onboard receiver connected to said control unit for receiving a confirmation signal from said portable unit that is responsive to said request signal, and
   a key fob slot provided on the vehicle for receiving a key fob and connected to said control unit, wherein said control unit is configured to start said engine when at least one of:
      said onboard receiver receives said confirmation signal responsive to said request signal and said master switch is in said ON position, or
      said key fob is determined to be in said key fob slot and said master switch is in an OFF position.

26. The smart communication system of claim 25 further including:
   a locking mechanism connected to said control unit for locking said key fob in said key fob slot, said control unit configured to actuate said locking mechanism to lock said key fob in said key fob slot when said key fob is in said key fob slot and said engine start signal is received.

27. The smart communication system of claim 26 wherein said key fob is not locked in said key fob slot by said locking mechanism when said master switch is in said ON position.

* * * * *